3,652,643
METHYL 3,3-DICHLORO-1-LOWER ALKOXY-2-OXO
CYCLOPENTANE CARBOXYLATE
Charles M. Leir, Groton, Conn., assignor to
Pfizer Inc., New York, N.Y.
No Drawing. Filed Apr. 28, 1969, Ser. No. 820,013
Int. Cl. C07c 69/74, 49/36
U.S. Cl. 260—468 R          6 Claims

ABSTRACT OF THE DISCLOSURE

Preparation of 2-hydroxy-3-lower alkyl-cyclopent-2-en-1-one via cyclizing dialkyladipate to 2-carboalkoxycyclopentan-1-one, 2-alkylation thereof to obtain 2-lower alkyl-2-carboalkoxycyclopentan-1-one, chlorination thereof to the corresponding 5,5-dichloro compound, a new compound, and acid hydrolysis to desired product, said product being used as a flavor enhancing agent.

BACKGROUND OF THE INVENTION

This invention relates to the preparation of 2-hydroxy-3-lower alkyl-cyclopent-2-en-1-ones and to novel 5,5-dichloro - 2-lower alkyl-2-carbomethoxycyclo-pentan-1-one intermediates. More particularly, the present invention involves cyclization of dialkyladipate to 2-carboalkoxycyclopentan-1-one, alkylation thereof to 2-lower alkyl 2-carboalkoxycyclopentan-1-one, bromination or chlorination thereof to 5,5-dichloro or 5,5-dibromo-2-lower alkyl-2-carboalkoxycyclopentan-1-one and acid hydrolysis to obtain desired product.

The final products of the instant invention are useful as flavor enhancing agents for beverages, tobacco, confections and in blending perfumes. The 2-hydroxy-3-methylcyclopent-2-en-1-one compound has been commercially available for such purposes for some time. More recently, it has been discovered that the corresponding 3-ethyl compound is not only useful for the same purposes, but also represses undesirable flavor notes without introducing other undesirable flavor notes. All of the compounds of the instant invention are used in the same manner, i.e., impart flavors when added in relatively small quantities of the order of 0.5 to 300 p.p.m., preferably 2 to 200 p.p.m.

The above referred to 3-methyl and 3-ethyl compounds are present as natural constituents of roasted coffee. Recovery and purification thereof is a laborious and expensive procedure. Additionally, various methods have been proposed to synthesize the compounds of the instant invention. These suffer from the disadvantages of involved steps producing undesired by-products and requiring extensive purification procedures with consequential low yield results. The process of the instant invention is relatively simple procedurally and obtains high yields of relatively high purity product.

SUMMARY OF THE INVENTION

The over-all process of the instant invention for producing 2-hydroxy-3-lower alkyl-cyclopentan-1-ones comprises adding a dialkyladipate to a slurry of an appropriate base in an anhydrous inert solvent and distilling the resulting mixture at reduced pressure to obtain the metal salt of 2-carboalkoxycyclopentan-1-one, treating resulting slurry of said 2-carboalkoxy compound in a dipolar aprotic solvent with excess lower alkyl halide at elevated temperature to obtain 2-lower alkyl-2-carbomethoxycyclopentan-1-one, introducing chlorine, bromine, or sulfuryl chloride into an anhydrous reaction inert organic solvent solution of said 2-lower alkyl substituted compound at a temperature of from about 45 to about 60° C. to obtain 2-lower alkyl-2-carboalkoxy-5,5-dibromo- or dichloro-cyclopentan-1-one and acid hydrolyzing said latter compound to obtain desired product. The process aspects of the instant invention also include the aforesaid cyclizing and treatment with excess lower alkyl halide to obtain the 2-lower alkyl-2-carboalkoxycyclopentan-1-one and the aforesaid two steps coupled with the chlorination or bromination step to produce the novel 2-lower alkyl-2-carbomethoxy-5,5-dibromo- or dichlorocyclopentan-1-one.

DETAILED DESCRIPTION OF THE INVENTION

The cyclization of dialkyladipate in accordance with the present invention involves treatment of a lower alkyl ester of adipic acid with at least an equimolar quantity of an appropriate base, and preferably a slight excess thereof, in an anhydrous, inert reaction solvent, with agitation. While any lower alkyl ester of adipic acid can be used in the cyclization reaction, we prefer the methyl and ethyl esters. Of the bases that can be used we prefer the alkali metal alkoxides, and the alkali metal hydrides such as sodium hydride and lithium hydride. Sodium methoxide has been found to give excellent results. The inert reaction solvent can be either polar or non-polar. Generally we prefer to use dipolar aprotic solvents such as dimethylformamide, dimethylacetamide, and dimethylsulfoxide, with dimethylformamide being the solvent of choice. Included among the non-polar solvents that can be used are the xylenes, toluene, and benzene.

The reaction mixture in the cyclization step is heated under reduced pressure from about 80–140° C., the exact temperature depending upon the solvent used. The alkanol formed in the cyclization of the adipate ester, e.g., methanol, and some of the reaction solvent are distilled from the reaction mixture thereby enhancing the yield of the alkali metal 2-carboalkoxycyclopentan-1-one. The resulting clear brown solution is cooled whereupon the alkali metal salt precipitates and may be isolated if desired. Usually, however, it is convenient to use the slurry of the salt directly in the next process step.

Treatment of the aforesaid alkali metal-2-carboalkoxycyclopentan-1-one with excess lower alkyl halide yields 2-lower alkyl - 2 - carboalkoxycyclopentan-1-one. Preferred conditions involve the use of at least 1.1 moles of lower alkyl halide per mole of the alkali metal salt of 2-carbomethoxycyclopentan-1-one at temperatures ranging from about 25° to about 100° C. and depending upon the choice of lower halide reactant. The alkylation reaction is preferably carried out in a dipolar aprotic solvent such as dimethylformamide, dimethylacetamide, or dimethylsulfoxide. For convenience, dimethylformamide is generally used. The preferred alkylating agents are the alkyl and arylalkyl halides although the corresponding tosylates and sulfates can be used as well. Of the alkyl and arylalkyl halides the iodides and bromides are generally preferred. While as a class the chlorides do not give the best yields, methyl and benzyl chloride have been found to give excellent yields of the 2-methyl and 2-benzyl derivatives. It has been found, however, that good results can be obtained with the alkyl and arylalkyl chlorides if 5–10% by weight of the corresponding iodide, or alternatively, the alkali metal iodide, is added as well. Following akylation, residual solvent may be removed by distillation under reduced pressure and the product may be further purified as described in the examples appearing hereinafter.

Chlorine or sulfuryl chloride is then introduced into a reaction inert organic solvent of the aforesaid 2-lower alkyl substituted compound at a temperature of from about 45 to about 60° C. to obtain 2-lower alkyl-2-carbomethoxy-5,5-dichlorocyclopentan-1-one. The reaction is generally exothermic and requires external cooling. The identity of the anhydrous reaction inert organic solvent is not critical to the instant invention, i.e., it may be any one of a variety of solvents which are reaction inert to the reactants and dissolve the 2-lower alkyl staring compound. Particularly preferred solvents include glacial acetic acid, chloroform, carbon tetrachloride, and dichloroethylene, with glacial acetic acid being especially preferred. The resulting 5,5-dichloro substituted compound may be recovered by distillation of the inert organic solvent followed by fractional distillation of the residue.

Instead of using chlorine in the above reaction, bromine can be used to give the corresponding 5,5-dibromo derivative. However, because of the higher cost of bromine little advantage would be realized in its use.

The final products of the instant invention are obtained by acid hydrolysis of the aforesaid 5,5-dichloro compound. Typical hydrolysis procedures are described in more detail in the working examples hereinafter. Essentially, any combination of water, mineral acid and solubilizing agent will work. By the term solubilizing agent is meant a solvent which when added to the hydrolysis mixture will cause the 5,5-dichloro compound to go into solution. Suitable solvents for this purpose include acetic acid, formic acid, and the lower alkanols.

Preferred hydrolytic procedures are described in greater detail below.

The foregoing description of the present invention is for the purpose of illustration only. Procedural details are set forth hereinafter in the working examples for said same purpose.

EXAMPLE I

Sodium 2-carbomethoxycyclopentan-1-one

A 1 liter 4-necked round bottom flask is fitted with a mechanical stirrer, a thermometer, a nitrogen inlet tube and a Y-tube equipped with a dropping funnel and a Vigruex column containing a condenser and adapter for vacuum distillation. The pressure is regulated by means of a needle valve connected to a nitrogen source. The flask is purged with dry nitrogen and charged with 56.4 g. (1.06 moles) of sodium methoxide and 250 ml. of dry dimethyl formamide. Dimethyl adipate (174 g., 1.0 mole) is rapidly added with stirring from the dropping funnel. After addition is complete the nitrogen inlet is closed, the water aspirator turned on, and the pressure adjusted to about 165 mm. with the needle valve regulator. The clear, light brown solution is stirred and heated and the methanol which is formed during the reaction is allowed to distill. The reaction is complete when the reaction mixture temperature reaches about 110–112° C. and the head temperature remains constant at about 105–108° C. (½–1 hour). The vacuum is released using the nitrogen inlet tube and the solution is allowed to cool to room temperature under a stream of dry nitrogen.

Substantially the same results are obtained when the following bases are used instead of sodium methoxide: potassium methoxide, sodium ethoxide, potassium n-propoxide, sodium n-butoxide, lithium ethoxide, sodium hydride, potassium hydride and lithium hydride.

EXAMPLE II

The procedure of Example I is repeated using diethyl adipate, di-n-propyl adipate and di-n-butyl adipate instead of dimethyl adipate to give the alkali metal salts 2 - carboethoxycyclopentan - 1 - one, 2 - carbo - n - propoxycyclopentan-1-one and 2-carbo-n-butoxycyclopentan-1-one, respectively.

EXAMPLE III 2-methyl-2-carbomethoxycyclopentane-1-one

The slurry of sodium 2-carbomethoxycyclopentane-1-one in DMF of Example I is cooled to 0–10° C. and 101 g. (2.0 moles) of methyl chloride is bubbled in rapidly with stirring. The reaction vessel is sealed and the temperature raised to 90–95° C. After 1 hour, the mixture is cooled to room temperature, any residual pressure released, and the DMF is removed by distillation of the mixture at 20 mm. with a bath temperatue of 70–75° C. Benzene (1 liter) is added to the residue and the mixture extracted with water (200 ml.). After drying over magnesium sulfate and filtering, the benzene is removed by vacuum (20 mm.) distillation at a bath temperature of 50–60° C. leaving 160–170 g. of a light yellow oil as residue. Besides residual solvent, the crude product contains 5–15% of α-methyl dimethyladipate as the only impurity. It is sufficiently pure for chlorination in Example IV hereinafter.

EXAMPLE IV 5,5-dichloro-2-methyl-2-carbomethoxycyclopentane-1-one

Crude 2 - methyl - 2 - carbomethoxycyclopentane - 1-one (160–170 g.) is dissolved in 1 liter of glacial acetic acid. A small amount of chlorine gas is added to the solution. After the green color has dissipated, chlorine is bubbled in rapidly with stirring while the temperature is held at 45–50° C. with external cooling. After about 2.75 hours and after 125–130 g. (1.8 moles) have been added, chlorine consumption ceases. After removal of the acetic acid by vacuum (20 mm.) distillation at a bath temeprature of 45–50° C., crude 5,5-dichloro-2-methyl-2-carbomethoxycyclopentane-1-one is obtained as a yellow oil (215–220 g.) Besides residual solvent, 5–15% of α-methyl dimethyladipate is present as the only impurity. This material is sufficiently pure for hydrolysis in Example V hereinafter.

EXAMPLE V 2-hydroxy-3-methylcyclopent-2-en-1-one

A mixture of crude 5,5-dichloro-2-methyl-2-carbomethoxycyclopentan-1-one (215–220 g.) and 2 liters of 10% sulfuric acid is heated under reflux with vigorous stirring for 24 hours. The resulting brown solution is cooled to room temperature, filtered from a small amount of black oil, saturated with sodium sulfate, and extracted with three 200 ml. portions of ethyl acetate. The combined extracts are washed with saturated bicarbonate solution, dried over magnesium sulfate, and evaporated to dryness to afford 90–100 g. (85–88% from dimethyladipate) of 2 - hydroxy - 3 - methylcyclopent - 2 - en - 1-one of M.P. 98–102°. The material is recrystallized from hexane or ethyl acetate (90% recovery) to give material of M.P. 103–104°.

2 - hydroxy - 3 - methylcyclopent - 2 - en - 1 - one, is also obtained when the alkali metal salts of the 2-carboalkoxycyclopentane-1-ones in Example II are used in the procedure of Example III and the resulting products reacted according to the procedures of Example IV and the above process.

EXAMPLE VI 2-ethyl-2-carbomethoxycyclopentan-1-one

After the vacuum is released at the end of the procedure in Example I, the temperature of the sodium 2-carbomethoxycyclopentan-1-one solution is allowed to fall to about 50° C. Additional dimethyl formamide (150 ml.) is then added to prevent precipitation of the salt. Ethyl chloride (77.4 g., 1.2 moles) and sodium iodide (15.0 g., 0.1 mole) are added to the solution and the reaction vessel is sealed and heated to 90–100° C. The reaction is complete in about 1–3 hours as indicated by a drop in the pH of the reaction mixture to about 8–8.5. After cooling the reaction mixture to room temperature an equal volume of dry benzene is added to the light tan mixture and sodium chloride and iodide is filtered and washed with benzene. The benzene and dimethyl formamide are removed on a rotary evaporator under reduced pressure. The resulting oil is taken up in an equal volume of benzene and the resultant solution is washed once with 50–100 ml. of water, dried over anhydrous magnesium sulfate and the benzene evaporated to afford 2-ethyl-2-carbomethoxycyclopentan-1-one as a light yellow oil. Yield 154–155 g. (91%). V.P.C. analysis indicates that the product is more than 95% pure.

EXAMPLE VII 5,5,-dichloro-2-ethyl-2-carbomethoxycyclopentan-1-one

The crude oil obtained in Example VI is added to a 2 liter, 3-necked round-bottomed flask equipped with a magnetic stirrer, thermometer, calcium sulfate drying tube and a chlorine delivery tube. One liter of glacial acetic acid is added to the flask and chlorine gas is bubbled rapidly into the vigorously stirred solution. The temperature is maintained at 45–50° C. by means of a water bath. After 125–130 g. of chlorine has been added the absorption almost ceases. The reaction is complete when V.P.C. analysis indicates the complete absence of any starting material and monochloro product (1–1½ hours). The excess chlorine and acetic acid are removed on a rotary evaporator under reduced pressure to afford 5,5-dichloro-2-ethyl-2-carbomethoxycyclopentan-1-one as an almost colorless oil. Yield 210–220 g.

EXAMPLE VIII 2-hydroxy-2-ethylcyclopent-2-en-1-one

Procedure A.—A mixture of 450 ml. of n-propanol, 400 ml. of water, 50 ml. of concentrated hydrochloric acid, and 220–240 g. of crude 5,5-dichloro-2-ethyl-2-carbomethoxycyclopentan-1-one is stirred and heated to reflux. The azeotrope of n-propanol and water is allowed to distill from the mixture until the solution just turns cloudy. The mixture is then heated under reflux until homogeneous. Distillation is continued until the solution is again cloudy, and this process is repeated for about 33 hours. The remaining n-propanol is distilled from the dark brown aqueous solution which is cooled, extracted with three 300 ml. portions of ethyl acetate, the combined extracts washed with saturated sodium bicarbonate solution until the washings are basic, dried over magnesium sulfate, and evaporated to dryness. The dark brown oil is distilled under high vacuum and the fraction boiling at 64–74°/0.1–0.2 mm. is collected in an ice-cooled receiver. 2-hydroxy-3-ethylcyclopent-2-en-1-one is obtained as a white crystalline mass which is 99.5–99.9% pure. The yield is 75–80 g. (60–64% from dimethyladipate). On recrystallization from hexane-methylene chloride (80% recovery), the material obtained has an M.P. of 42–44° C. Since 2-hydroxy-3-ethylcyclopent-2-en-1-one is relatively unstable, it should be dissolved in 15–20% by weight of absolute or 95% ethanol.

Procedure B.—A mixture of 200–240 g. of crude 5,5-dichloro-2-ethyl-2 - carbomethoxycyclopentan-1-one, 750 ml. of water and 250 ml. of formic acid is stirred and heated under reflux for about 5.5 hours. The dark brown solution is cooled, concentrated to a volume of 550–650 ml. by vacuum (20 mm.) distillation at a bath temperature of 50–60° C., extracted with three 200 ml. portions of ethyl acetate, and the combined extracts worked up as in Procedure A. The yield of distilled material is 75–80 g. (60–64% from dimethyladipate).

Procedure C.—A mixture of 220–240 g. of crude 5,5-dichloro-2-ethyl-2-carbomethoxycyclopentane-1-one, 700 ml. of water and 700 ml. of ethylene glycol is stirred and heated under reflux for about 7.5 hours. The dark brown solution is cooled to room temperature and extracted with three 300 ml. portions of ethyl acetate. Work-up of the combined extracts is conducted as in Procedure A. The yield of distilled material (prior to recrystallization) is 70–75 g. (55–60% from dimethyladipate).

Procedure D.—To a 5 liter 3-necked round-bottom flask equipped with a mechanical stirrer, reflux condenser, thermometer, and a heating mantle; and containing the 5,5-dichloro-2-ethyl-2-carbomethoxycyclopentan-1-one is added 3600 ml. of 5% hydrochloric acid and 600 ml. of glacial acetic acid. The mixture is stirred and heated under reflux until the g.l.c. of the sample indicates complete disappearance of the dichloro compound (11½–12½ hours). The clear brown solution is cooled to room temperature and extracted with five 700-ml. portions of ethyl acetate. The combined extracts are evaporated to dryness on a rotary evaporator under reduced pressure to afford a dark oil. This crude ethylcyclopentenolone is distilled and the fraction, B.P. 73–77° C./0.1 mm., amounts to 85–88 g. (69–70% yield based on the dimethyladipate used). The colorless crysetal product (99.5–99.9% pure) is recrystallized by dissolving it in 50 ml. of methylene chloride and 10 ml. of methanol, adding 1 liter of n-hexane and concentrating the resulting solution under high vacuum to about 700 ml. The pure, white product is filtered, washed with cold n-hexane and air-dried (about 70% recovery). A second crop (about 15%) can be obtained by concentration of the mother liquors to a volume of 400–500 ml. As soon as possible after isolation the material must be dissolved in at least 20–25% by weight of 95% ethanol to avoid decomposition. Stored in this manner the material is stable indefinitely.

2-hydroxy-3-ethylcyclopent-2-en-1-one is also obtained when the alkali metal salts of the 2-carboalkoxycyclopentane-1-ones in Example II are used in the procedure of Example VI and the resulting products reacted according to the procedure of Example VII and the hydrolysis procedures above.

EXAMPLE IX

The procedures of the foregoing examples are employed in the preparation of compounds of the formula:

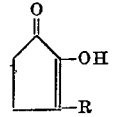

wherein the identity of the alkylating agent, R, and the melting point or boiling point are as follows:

| Alkylating agent | R | ° C. |
| --- | --- | --- |
| Benzyl chloride | Benzyl | 98–100 (M.P.). |
| n-Propyl iodide | n-propyl | 54–56 (M.P.). |
| n-Butyl iodide | n-Butyl | 86–88/0.05 mm. (B.P.). |
| Sec-butyl iodide | Sec-butyl | 90–92 (M.P.). |

What is claimed is:
1. 5,5-dichloro-2-lower alkyl-2-carbomethoxycyclopentan-1-one.
2. The compound of claim 1 wherein lower alkyl is methyl.
3. The compound of claim 1 wherein lower alkyl is ethyl.
4. The compound of claim 1 wherein lower alkyl is n-propyl.
5. The compound of claim 1 wherein lower alkyl is n-butyl.
6. The compound of claim 1 wherein lower alkyl is sec-butyl.

(References on following page)

References Cited

FOREIGN PATENTS 12,584   5/1968   Japan ............. 260—468

OTHER REFERENCES

Berlinquet et al. Can J. Chem. 40 353–358, 366 (1962).
Dang-Ouoc-Quom, Compte Rendo C 207, 924 (1966).
Salmon-Legagneuer et al., Compte Rendo C, 263, 1442, (1966).
Zaputryaev et al., Zhur, Obshchei Khim, 27, 2214, (1957).
Leir., J. Org., Chem. 35 3203 (1970).

LORRAINE A. WEINBERGER, Primary Examiner
R. GERSTL, Assistant Examiner

U.S. Cl. X.R.

131—17 R, 144; 252—522; 260—469, 586 R, 590